No. 755,806. PATENTED MAR. 29, 1904.
C. F. SPERY.
NUT LOCK.
APPLICATION FILED JAN. 26, 1904.
NO MODEL.

Witnesses:
S. T. Schreiber
E. Behel.

Inventor:
Charles F. Spery
By A. T. Behel
Atty.

No. 755,806. Patented March 29, 1904.

UNITED STATES PATENT OFFICE.

CHARLES F. SPERY, OF ROCKFORD, ILLINOIS, ASSIGNOR OF TWO-THIRDS TO LEWIS A. WEYBURN, OF ROCKFORD, ILLINOIS.

NUT-LOCK.

SPECIFICATION forming part of Letters Patent No. 755,806, dated March 29, 1904.

Application filed January 26, 1904. Serial No. 190,756. (No model.)

*To all whom it may concern:*

Be it known that I, CHARLES F. SPERY, a citizen of the United States, residing at Rockford, in the county of Winnebago and State of Illinois, have invented certain new and useful Improvements in Nut-Locks, of which the following is a specification.

The object of this invention is to construct a nut-lock comprising two sections one of which is compressed by the action of the other upon it and so arranged that in seeking to separate the sections an impinging action will take place between them.

Figure 1:
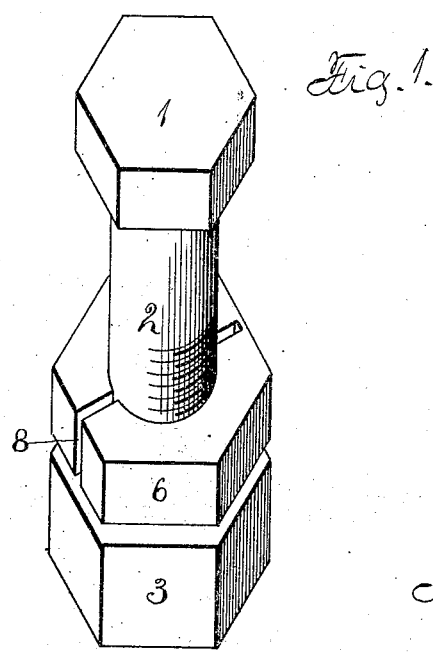
Figure 2:
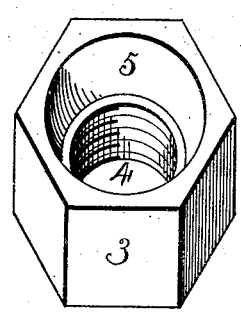
Figure 3:
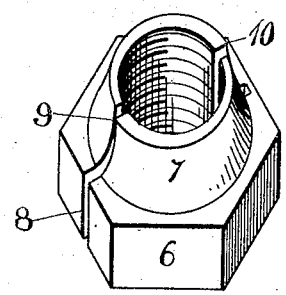

In the accompanying drawings, Figure 1 is an isometrical representation of my improved nut-lock in place in connection with a bolt. Fig. 2 is an isometrical representation of the nut proper. Fig. 3 is an isometrical representation of the compressible section.

The bolt 1 is of the ordinary construction, having the screw-threaded section 2.

The nut proper, 3, has a screw-threaded opening 4 and an enlarged cavity 5, as shown at Fig. 2.

The compressible section (shown at Fig. 3) comprises the headed portion 6 and conical-shaped portion 7. The head and conical portions are nearly separated by the slot 8. The two sections of the conical portion are in eccentric form, as shown at Fig. 3, which leaves two extending projections 9 and 10 diametrically opposite each other.

In use the compressible section is turned onto the bolt up against the work, the flat side of the head in contact with the work. The nut proper is then turned onto the bolt, its concave face receiving the cone-shaped projection of the compressible section. As the nut proper is turned up the screw-threaded opening in the compressible section being larger than the bolt allows the cone-section to compress, which will exert an increased pressure against the inner surface of the concave face of the nut proper, and in undertaking to remove the nut proper the sharp projections 9 and 10 will bite into the surface of the nut proper and hold it firmly in position on the bolt.

I do not mean that the nut proper cannot be removed, but that it is held in position with greater force than if simply turned up against the work without the compressible section and with sufficient force to prevent it becoming accidentally displaced.

I claim as my invention—

A nut-lock comprising two internally-threaded sections, the one having a conical cavity, and the other a substantially conical projection, composed of oppositely-arranged eccentric portions separated by a longitudinal slot extending through the cone and one wall of the corresponding section, substantially as set forth.

CHARLES F. SPERY.

Witnesses:
   A. O. BEHEL,
   L. A. WEYBURN.